(No Model.)
R. W. JACOBS.
GANG CHEESE PRESS.
No. 323,337. Patented July 28, 1885.
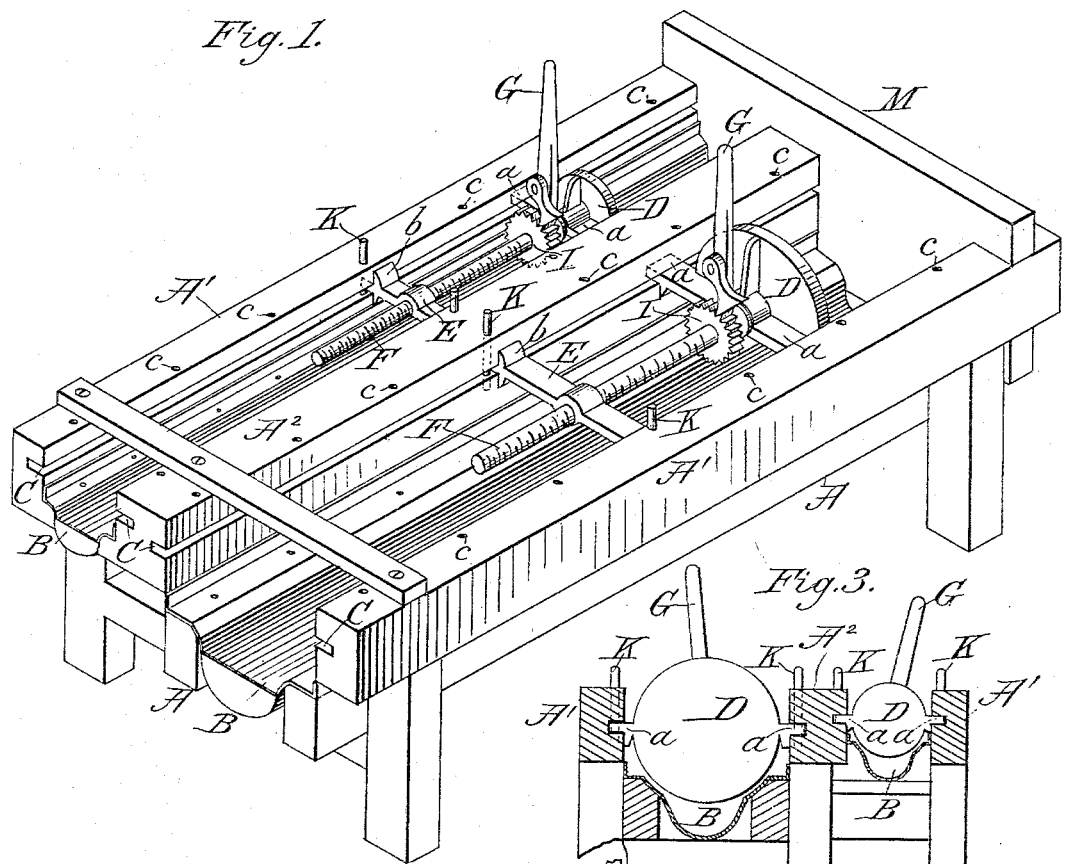

UNITED STATES PATENT OFFICE.

ROBERT W. JACOBS, OF ROME, ASSIGNOR TO BURRELL & WHITMAN, OF LITTLE FALLS, NEW YORK.

GANG CHEESE-PRESS.

SPECIFICATION forming part of Letters Patent No. 323,337, dated July 28, 1885.

Application filed March 13, 1885. (No model.)

*To all whom it may concern:*

Be it known that I, ROBERT W. JACOBS, a citizen of the United States, residing at Rome, in the county of Oneida and State of New York, have invented certain new and useful Improvements in Gang Cheese Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a gang cheese-press capable of pressing two or more sizes of cheese—such as Cheddar and Young America—at the same time or separately.

To this end the invention consists of a combination gang cheese-press in which the opposite sides, with troughs and accompanying platens and their actuating mechanism, are of unequal size, the two sides varying in width and depth according to the dimensions of the cheese to be made.

In the annexed drawings, illustrating my invention, Figure 1 is a perspective view of my improved gang cheese-press. Fig. 2 is a longitudinal section, and Fig. 3 is a transverse section in front of the platens.

Like letters of reference designate like parts in the several views.

The press-frame A may be made in any convenient manner, and is divided longitudinally into two parts, preferably of unequal width and depth, in each of which is supported a metallic trough, B, for receiving and conveying away the moisture expelled from the curd that is placed in the cheese-hoops. Above the troughs B B are longitudinal ways or guide-grooves C C, that are formed in the frame of the machine for the reception and support of the adjustable platens D D, and the adjustable head-blocks E E, the latter being each provided centrally with a screw-threaded aperture for the engagement of a power-screw, F, the forward end of which is journaled in the back of the adjacent platen. The platens D D are provided with arms *a a*, that are shouldered to enter the ways C C, in and along which they have a bearing. The ends of the head-blocks E E are also shouldered at *b b* for a like purpose. The rear side of each platen is ribbed to insure strength, and is formed with a central aperture for receiving the forward end of the power-screw F, which is connected thereto in such a manner as to be capable of rotation without rotating the platen, the latter being intended to have only a forward and back movement under the action of the screw. On each power-screw F is loosely mounted a lever, G, that carries a pawl, H, which engages with a ratchet-gear, I, that is rigidly secured to said screw. Along each side of the press-frame, in the side pieces, A′ A′, and also in the inner longitudinal bar, A², are formed vertical apertures *c c*, that extend through the ways C C, and receive removable pins K K, that may be placed at any desired points in advance of the head-blocks E E, which are thus held in any position to which they may have been adjusted.

The cheese-hoops L L, which may be of any well-known or suitable construction, are supported on the flaring sides of the troughs B B between the platens D D and a bulk-head, M, that forms one end of the press-frame. After the cheese-hoops have been filled with curd and placed in position, the platens D and head-blocks E will be adjusted sufficiently to bring each platen in contact with or near the follower of the adjacent hoop, and the platen may then be made to exert the required pressure by operating the lever G, so as to cause its pawl H to actuate the ratchet I and power-screw F. The expressed whey and moisture are caught in the trough B, whence they may be drawn off and collected at one end.

Instead of the pawl-and-ratchet gear, or in connection therewith, the screw F may be provided with a crank, if desired.

As before remarked, the troughs or gutters B B are preferably of unequal width and depth, the accompanying mechanism on each side being varied in size accordingly. The dimensions of the opposite sides of the press may be thus so arranged that while a large cheese, as the Cheddar, can be made on one side, the other side can be used for pressing a variety of small cheese known as the "Young America." Both sides of the press may, however, be of equal size, if desired. By so arranging the press that a small and a large variety of cheese can be made on the opposite sides, as described, great economy and convenience is effected, especially in small factories.

Heretofore in gang cheese-presses the hoops have been arranged in horizontal or in vertical tiers, and in one or more series, operated either separately or simultaneously; but I am not aware that a cheese-press prior to my invention has been adapted to make both large and small cheese.

In my combination cheese-press herein described the small gutter or compartment is preferably arranged to take in about twenty hoops varying in size from seven to ten inches in diameter, while the large gutter is arranged for receiving about twelve hoops that vary in diameter from about thirteen to sixteen inches. Thus thirty-two cheeses in all, and of two sizes, can be made at one time.

It is of very great convenience for the factories to have this combination-press, as by its use they can make large cheese in the summer when milk is plentiful, and small cheese at the same time or at other times, whenever required.

Having thus described my invention, what I claim as new, and desire to secure by Letters Patent, is—

1. A gang cheese-press having its opposite sides arranged for pressing a series of large cheese and a series of small cheese, respectively, substantially as described.

2. In a gang cheese-press, the combination, with the frame A, having ways C C, bulk-head M, and removable pins K K, of the troughs B B, adjustable platens D D, adjustable head-blocks E E, power-screws F F, and actuating mechanism, the opposite sides of said press being of unequal size, substantially as described.

In testimony whereof I affix my signature in presence of two witnesses.

ROBERT W. JACOBS.

Witnesses:
GEO. M. ALBOT,
JAMES P. OLNEY.